(12) United States Patent
Raynor et al.

(10) Patent No.: US 7,375,752 B2
(45) Date of Patent: May 20, 2008

(54) SOLID STATE IMAGING DEVICE WITH DEDICATED SINGLE PIXEL READOUT CHANNELS AND ASSOCIATED METHODS

(75) Inventors: Jeffrey Raynor, Edinburgh (GB); Peter Denyer, Edinburgh (GB); Jonathan Ephriam David Hurwitz, Edinburgh (GB)

(73) Assignee: STMicroelectronics, Ltd. (GB)

( * ) Notice: Subject to any disclaimer, the term of this patent is extended or adjusted under 35 U.S.C. 154(b) by 775 days.

(21) Appl. No.: 09/993,387

(22) Filed: Nov. 16, 2001

(65) Prior Publication Data

US 2002/0114025 A1   Aug. 22, 2002

(30) Foreign Application Priority Data

Nov. 16, 2000   (GB) .................... 0027931.5

(51) Int. Cl.
H04N 3/14 (2006.01)
(52) U.S. Cl. ....................... 348/308; 348/241
(58) Field of Classification Search ........ 348/300–310, 348/241; 250/208.1
See application file for complete search history.

(56) References Cited

U.S. PATENT DOCUMENTS

| | | | |
|---|---|---|---|
| 5,055,930 A | 10/1991 | Nagasaki et al. | 358/213.11 |
| 5,621,660 A | 4/1997 | Chaddha et al. | 364/514 |
| 5,698,844 A * | 12/1997 | Shinohara et al. | 250/214 R |
| 5,742,892 A | 4/1998 | Chaddha | 455/5.1 |
| 5,768,535 A | 6/1998 | Chaddha et al. | 395/200.77 |
| 5,928,331 A | 7/1999 | Bushmitch | 709/231 |
| 5,941,951 A | 8/1999 | Day et al. | 709/233 |
| 6,091,777 A | 7/2000 | Guetz et al. | 375/24 |
| 6,094,636 A | 7/2000 | Kim | 704/500 |
| 6,130,712 A * | 10/2000 | Miyazaki et al. | 348/243 |
| 6,173,013 B1 | 1/2001 | Suzuki et al. | 375/240.16 |
| 6,215,766 B1 | 4/2001 | Ammar et al. | 370/229 |
| 6,233,017 B1 | 5/2001 | Chaddha | 348/412 |
| 6,256,623 B1 | 7/2001 | Jones | 707/3 |
| 6,263,022 B1 | 7/2001 | Chen et al. | 375/240.03 |
| 6,266,817 B1 | 7/2001 | Chaddha | 725/146 |
| 6,275,531 B1 | 8/2001 | Li | 375/240.12 |
| 6,275,847 B1 | 8/2001 | Robinson | 709/201 |

(Continued)

OTHER PUBLICATIONS

Itoh et al. "4-Layer 3-D IC with a Function of Parallel Signal Processing" Microelectronic Engineering, NL, Elsevier Publishers BV., Amsterdam, vol. 15, No. 1/04, Oct. 1, 1991, pp. 187-190, XP000292757.

(Continued)

*Primary Examiner*—Lin Ye
*Assistant Examiner*—Anthony J Daniels
(74) *Attorney, Agent, or Firm*—Lisa K. Jorgenson; Allen, Dyer, Doppelt, Milbrath & Gilchrist, P.A.

(57) ABSTRACT

An image plane includes a plurality of pixels. Each pixel comprises a photodiode and two transistors, and each pixel is connected by a signal bus to a respective storage node located off the image plane. Each storage node comprises two capacitors and associated switches. One of the transistors applies a reset pulse to the pixel, and the other transistor connects the pixel to a given conductor of the signal bus, which is then connected to the storage node. The pixel transistors can be operated simultaneously, and the sensed values can subsequently be transferred from the storage nodes sequentially.

25 Claims, 7 Drawing Sheets

U.S. PATENT DOCUMENTS

| | | | |
|---|---|---|---|
| 6,466,265 B1 * | 10/2002 | Lee et al. | 348/308 |
| 6,667,768 B1 * | 12/2003 | Fossum | 348/308 |
| 6,972,795 B1 * | 12/2005 | Etoh et al. | 348/311 |
| 7,176,972 B2 * | 2/2007 | Mutoh et al. | 348/315 |
| 2001/0016008 A1 | 8/2001 | Bahl et al. | 375/240.18 |
| 2001/0023429 A1 | 9/2001 | Barker et al. | 709/203 |
| 2002/0154231 A1 * | 10/2002 | Decker et al. | 348/302 |

OTHER PUBLICATIONS

Akasaka et al. "The 3-D IC with 4-Layer Structure for the Fast Range Sensing System" Microelectronic Engineering, NL, Elsevier Publishers BV., Amsterdam, vol. 15, No. 1/04, Oct. 1, 1991, pp. 183-186, XP000292756.

Zhou et al. "Frame-Transfer CMOS Active Pixel Sensor with Pixel Binning" IEEE Transactions on Electron Devices, US, IEEE Inc. New York, vol. 4, No. 10, Oct. 1, 1997, pp. 1764-1768, XP000703891.

Steven McCanne et al, "Receiver-Driven Layered Multicast" (SIGCOMM—Aug. 1996, Stanford, CA).

Steven McCanne et al, "Low-Complexity Video Coding for Receiver-Driven Layered Multicst", Jan. 11, 1997.

* cited by examiner

SOLID STATE IMAGING DEVICE WITH DEDICATED SINGLE PIXEL READOUT CHANNELS AND ASSOCIATED METHODS

FIELD OF THE INVENTION

The present invention relates to a solid state imaging device which can be operated to provide an improved shutter function.

BACKGROUND OF THE INVENTION

There are various basic CMOS pixel structures. One common type, with 3 transistors per pixel, is described in U.S. Pat. No. 4,407,010 (referred to as the CMOS 3T pixel), and is illustrated in FIG. 1 of the accompanying drawings. This is an efficient structure, wherein transistor M1 amplifies an output from the photodiode while positioned within the pixel. Transistor M2 resets the voltage on the pixel, and transistor M3 is a multiplex transistor. Transistor M3 enables many pixels in a column to be wired together, and only one pixel is enabled at a time. The device Iload is typically a sense amplifier that provides a load for the source follower transistor M1, and also measures the output voltage.

The typical voltage on a photodiode is shown in FIG. 2. At point 1, the pixel is reset by turning on transistor M2 which sets the voltage on the reverse-biased diode to a preset voltage (VRT). After this point, light falling onto the pixel will create photo-generated electrons which will be attracted to the photodiode. This will cause the diode to be discharged. The amount of discharge is proportional to both the amount of light and also the amount of time. After a period of time (integration period Tint) the voltage on the pixel is measured. If the time Tint is kept constant, the swing will be proportional solely to the amount of light falling on the pixel.

Typically, as shown in FIG. 3, the pixels are arranged into a 2-dimensional grid of rows and columns. There is one Iload/sense amplifier per column. The amplifier measures the output voltage of the pixel. Several pixels and usually all the pixels in a column share a single sense amplifier. Because of this structure, all the elements in a row are read out simultaneously into the sense amplifiers and the rows are addressed sequentially.

As the rows are read out sequentially, they must also be reset sequentially. This keeps the integration time Tint constant for the whole sensor, and the brightness of the image constant over the image plane. This operation is called "rolling blade shutter" and is analogous to how a physical shutter in a 35 mm SLR camera works. In the CMOS 3T sensor, the integration time is variable. This is achieved by varying the time between the reset and readout pulse. This is also similar to how 35 mm SLR cameras work. The shutter blades move over the film at a constant rate, but a gap between the blades is adjusted to adjust the effective shutter speed.

Another common type of CMOS pixel has 4 transistors. There are various types of implementation, one of which is shown in FIG. 4. The advantage of this design is that it has two storage capacitances per pixel. Cpd is formed by the parasitic capacitance of the photodiode. The storage node Csn is formed partly by the stray capacitance of M1, M2 but also by creating a storage device inside the pixel. One advantage of a 4T pixel is sensitivity: V=Q/C. By reducing the value of Csn, the output voltage for a given photocharge is increased.

The 4T pixel has another advantage, which is its ability to form an electronic shutter. Although arrays of either 3T or 4T pixels can be reset simultaneously, the sequential readout mechanism of the 3T pixel prevents simultaneous readout. The 4T pixel does not suffer from this problem since it has a storage element incorporated inside each pixel (Csn in FIG. 4). This permits the entire array to be sensed simultaneously, i.e., a photo-generated charge is transferred from each pixel's Cpd to the pixel's Csn simultaneously.

The readout mechanism then proceeds in a row sequential fashion, similar to the mechanism used in the 3T pixels. As all the pixels in the array are reset and measured simultaneously, the array captures a snapshot of the light pattern falling on the sensor, unlike the rolling blade shutter of the 3T pixels. This technique is of great value for hand-held operation of the camera as the effect of camera shake is reduced as the total time for which the array is collecting light is minimized, as opposed to the time for which an individual pixel is collecting light.

There are significant disadvantages with a 4T pixel. The extra circuitry (M4, Csn) occupies an area on the pixel and this reduces the amount of light reaching the photodiode. Transferring all the charge from Cpd to Csn is difficult to achieve. Special CMOS manufacturing techniques are often employed to change the structure of the photodiode Cpd or the transfer transistor M4. These manufacturing techniques are very costly since as they are non-standard and are also difficult to reliably achieve.

There are also some linear arrays (see FIG. 5) with two rows of pixels which have separate electronics on both top and bottom. However, these structures are limited to a maximum of two rows. Other prior art in this area includes U.S. Pat. Nos. 4,835,617; 5,576,762; 5,134,489; 5,122,881; 5,471,515, and European Patent WO 98/08079.

SUMMARY OF THE INVENTION

An object of the present invention is to provide a solid state image sensor which, like the 3T sensor, can be manufactured by standard techniques, but which also is capable of providing a true electronic shutter.

In view of the foregoing background, this and other objects, advantages and features of the present invention are provided by a solid state imaging device comprising a two-dimensional array of pixels defining an image plane, and readout electronics comprising at least one store circuit laterally adjacent the image plane for reading signals therefrom in a predetermined manner.

The invention is based upon locating the readout electronics off the image plane of the device. In preferred forms of the invention, this is facilitated by connecting each pixel to its associated readout electronics via a multiconductor signal bus. The readout electronics may be laterally adjacent one side of the image plane, are they may be laterally adjacent opposing sides of the image plane.

Each pixel preferably comprises a photosensitive diode, and a switching circuit for resetting and discharging the diode. The switching circuit may includes a first transistor for applying a reset pulse, and a second transistor for connecting the diode to a conductor within the multiconductor signal bus.

The at least one store circuit preferably comprises a plurality of store circuits, with a store circuit corresponding to each pixel. Each store circuit may comprise a first store circuit for storing a reset value, and a second store circuit for storing a read out value. The read out value of a given pixel may be modified by the stored reset value for that pixel. A third store circuit stores a second reset value, with a current reset value and a current read out value being processed simultaneously based upon application of a new reset pulse.

BRIEF DESCRIPTION OF THE DRAWINGS

Embodiments of the invention will now be described, by way of example only, referring to the drawings in which.

DETAILED DESCRIPTION OF THE PREFERRED EMBODIMENT

Figure 1:
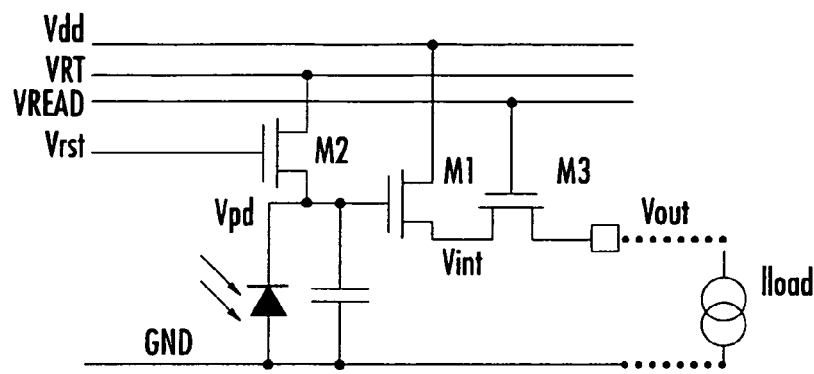
FIGS. 1 to 5 illustrate the prior art as discussed above.
Figure 2:
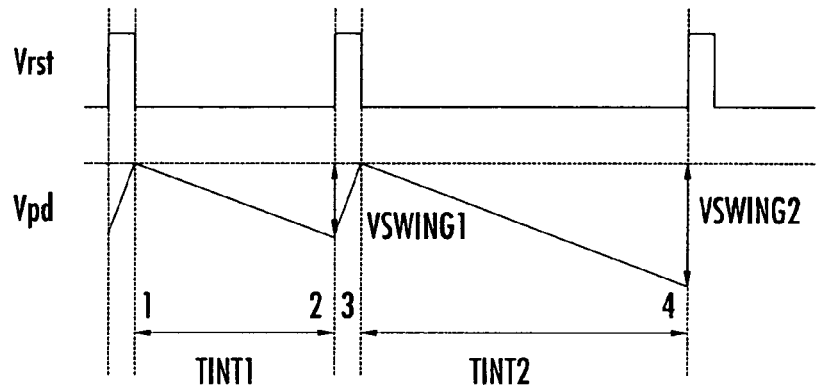
Figure 3:
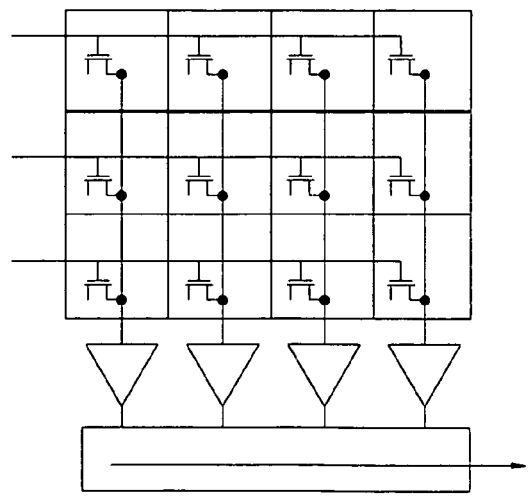
Figure 4:
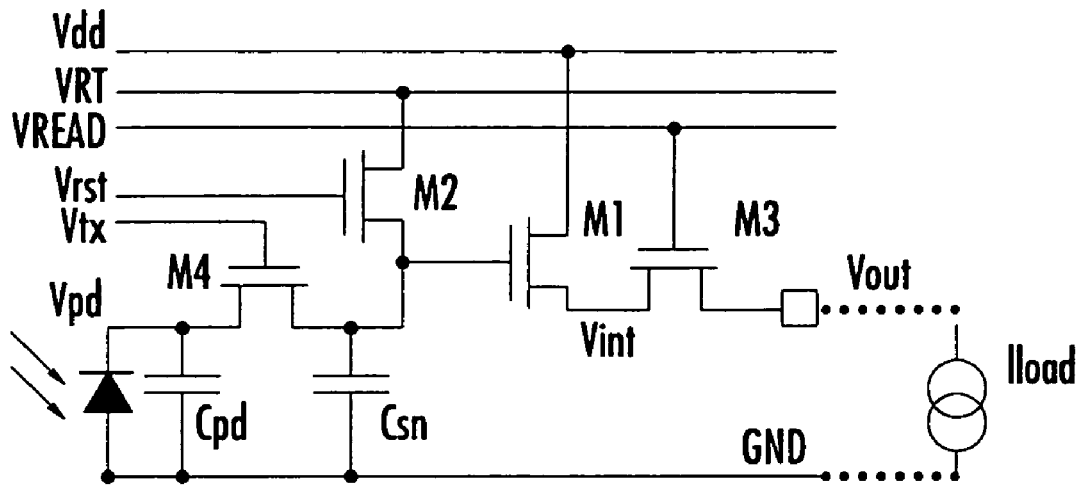
Figure 5:
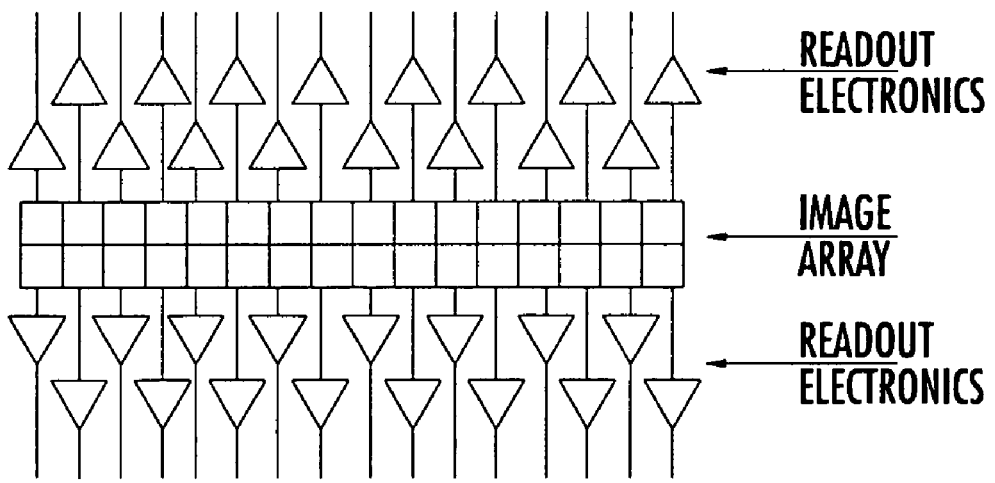
Figure 6:
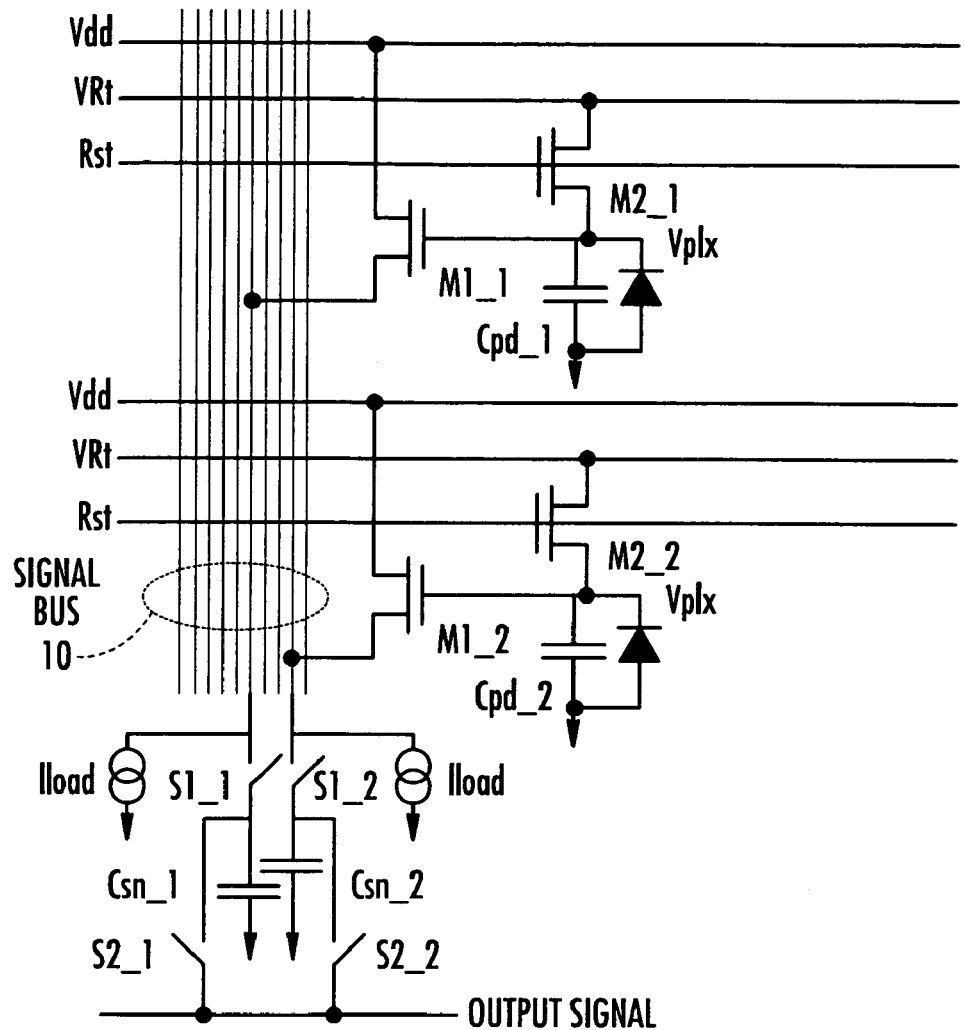
FIG. 6 shows part of one column of an array structure embodying the invention.

A basic feature of the invention is to provide a storage node per pixel, and to avoid degrading the fill factor and hence light sensitivity, by locating the storage element away from the image plane. Referring to FIG. 6, this embodiment has only two transistors, M1 and M2 per pixel, thus improving the fill factor and sensitivity. The array is not multiplexed, and therefore there is no mulitplex transistor in the pixel equivalent to M3 in FIG. 1. Instead, there is a connection to the signal bus 10 which runs through the column.

The switches S2-1, S2-2 will typically be implemented as MOSFET transistors. The current loads Iload are to ensure correct operation of sense transistor M1. FIG. 6 shows only two pixels, but in a practical array there are several pixels in a column.

The operation of the array is as follows. At point 1 (see FIG. 7) the Rst signal goes high, causing all the M2 transistors (M2_1, M2_2, etc.) to conduct and the voltage Vplx on the photodiode to be reset to VRt. At a time later point 2 (see FIG. 7), all the S1 switches (S1_1, S1_2, etc.) are closed simultaneously and the output of the sense transistors (M1) are stored on the sense capacitors (Csn_1, Csn_2). Subsequently (not shown), the signals on the sense capacitors are readout sequentially by sequentially closing switches S2 (S2_1, S2_2, etc.).

Figure 8:
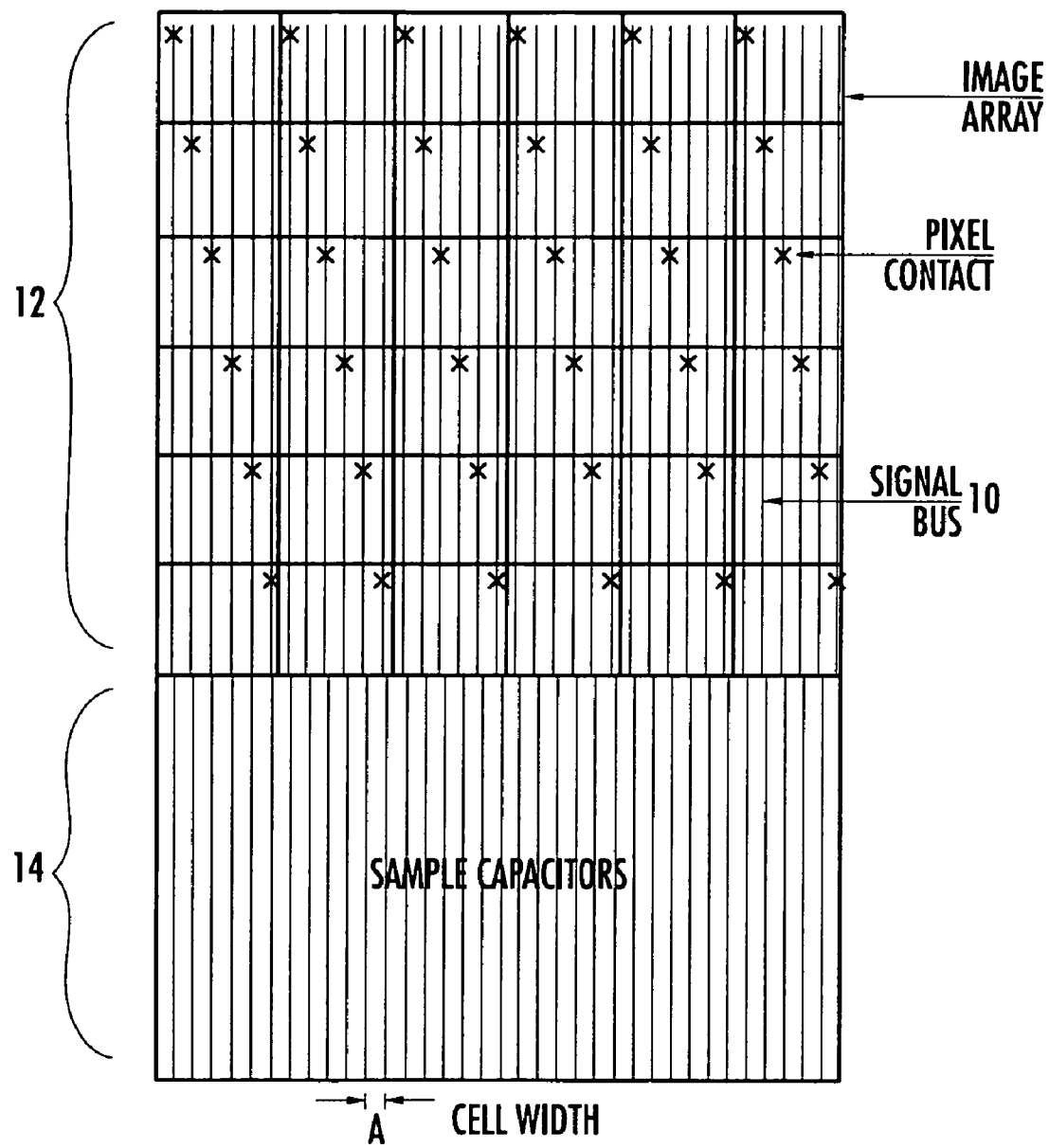
FIG. 8 shows a typical system layout of a sensor incorporating the circuitry of FIG. 6.

FIG. 8 shows a typical layout of a system with an image array 12 and sample capacitor area 14. To simplify the drawing, a 6×6 pixel structure is shown but the array would typically be larger. The output from each pixel is wired (indicated by the X in FIG. 8) to a different conductor of the signal bus 10. Each cell has a width A within the system.

Figure 7:
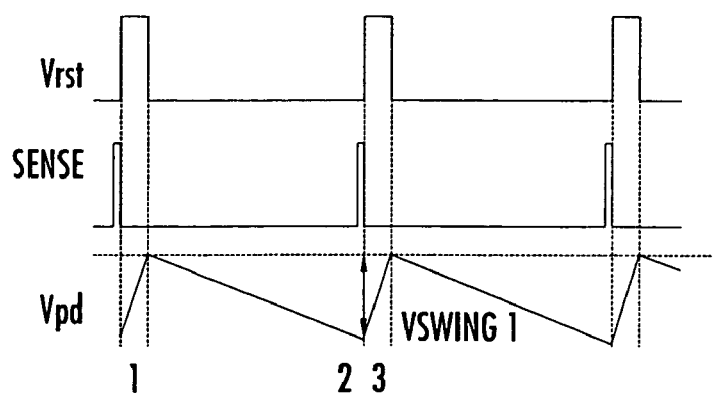
FIG. 7 is a timing diagram illustrating the operation of FIG. 6.

The embodiment of FIGS. 6 to 8 shows signal bus lines planar with the image plane, i.e., using the same conductor layer. One improvement (not shown) is to stack the conductors, that is, to use different conductive layers. This reduces the amount of metal covering the pixel and thus improves the amount of light collected by the pixel.

The system described in FIG. 6 is area and cost efficient, but it suffers from a fixed pattern noise in the form of brightness variations on the picture. This is due to the varying amount of threshold voltage of transistors M1 over the array. These variations are a normal part of the CMOS manufacturing process. A practical way of cancelling this offset is to measure, on a per-pixel basis, the reset voltage after the source follower.

Figure 9:
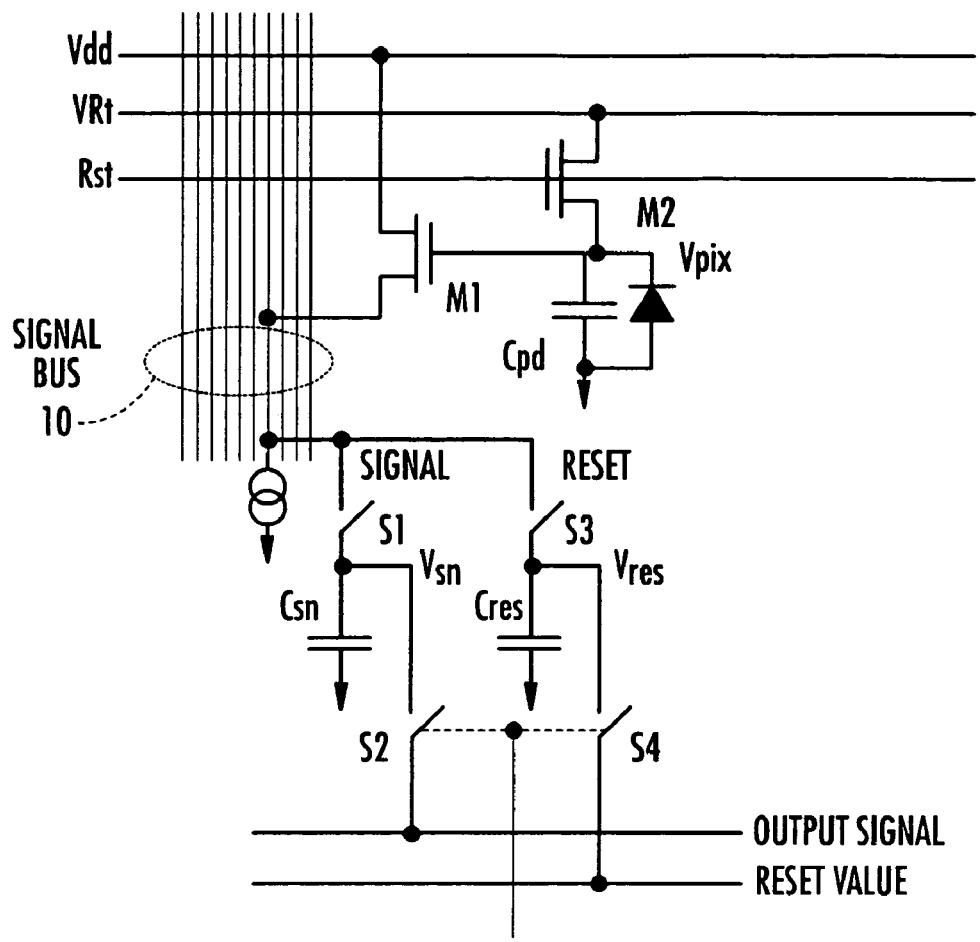
FIG. 9 shows one pixel and read-out circuitry of a modified version of FIG. 6.
Figure 10:
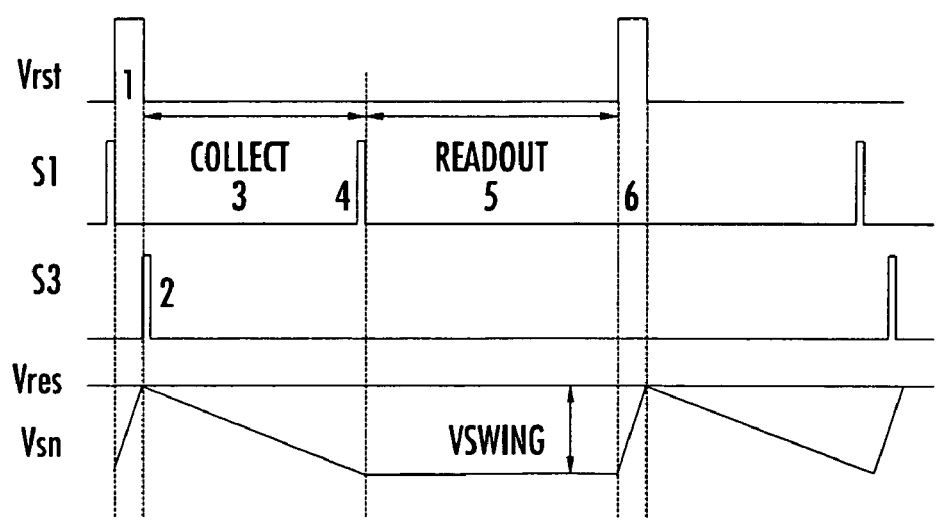
FIG. 10 is a timing diagram illustrating the operation of FIG. 9.

Referring to FIGS. 9 and 10, this is achieved by closing switch S3 (FIG. 9) immediately after the end of the reset pulse (2 in FIG. 10). This signal is then stored on Cres, and switch S3 is opened. For a period of time (3 in FIG. 10), the pixel collects light and the photo-charge discharges the photodiode. At the end of this period (4 in FIG. 10) the signal is sampled on Csn. During image readout (5 in FIG. 10), switches S2 and S4 are closed simultaneously and both the signal and reset values are output onto the output signal and reset value conductors. The threshold voltage can then be compensated by subtracting the reset value from the output signal.

This technique is similar to that used in U.S. Pat. No. 5,122,881 but is modified to deal with the present situation where no multiplex transistor is present.

Although the technique described previously (FIG. 9) cancels the offset, it degrades the rate at which the system can operate since it is not possible to perform image acquisition and readout simultaneously. This is because the reset signal (2 in FIG. 10) occurs at the start of an image acquisition, but is required during readout. A new acquisition is therefore not possible until readout has been completed.

Figure 11:
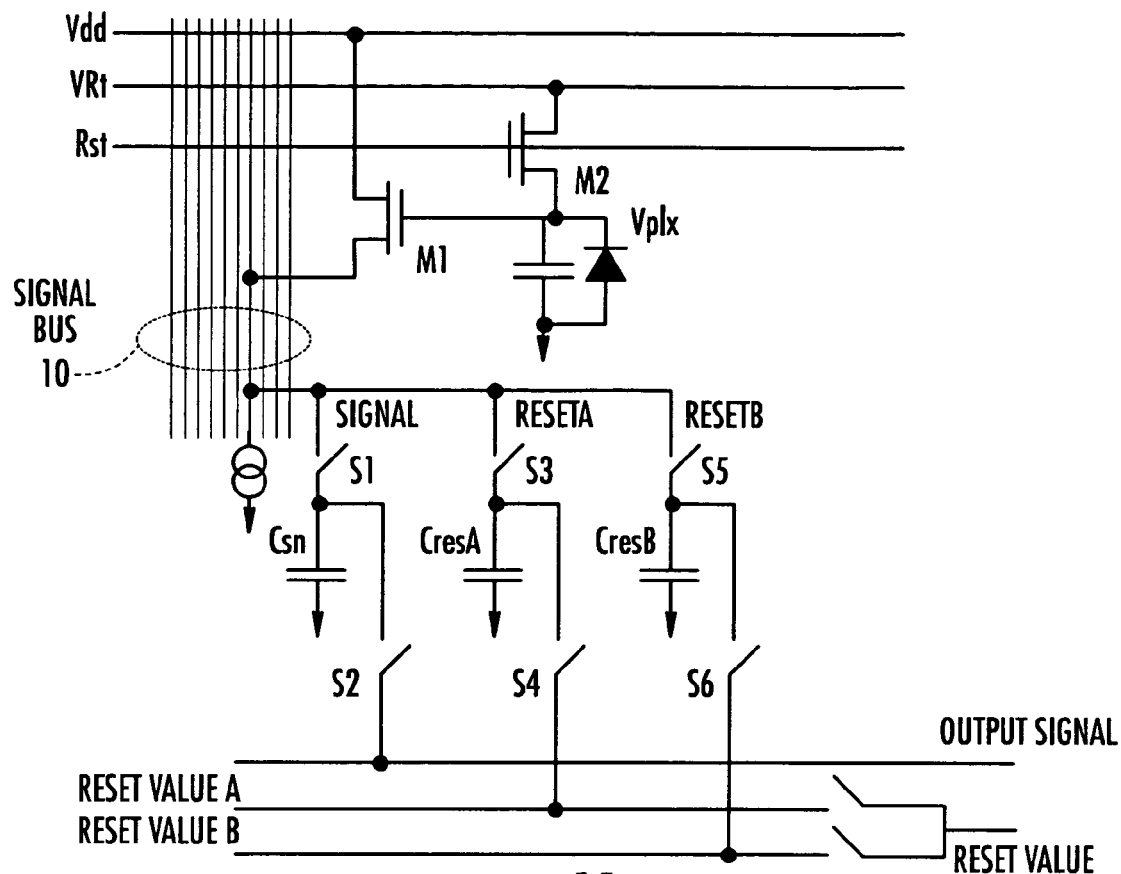
FIG. 11 shows one pixel plus read-out circuitry of a further modification of FIG. 6.

The solution to this problem is shown in FIG. 11. An extra capacitor per pixel is used to enable simultaneous image acquisition and readout.

Figure 12:
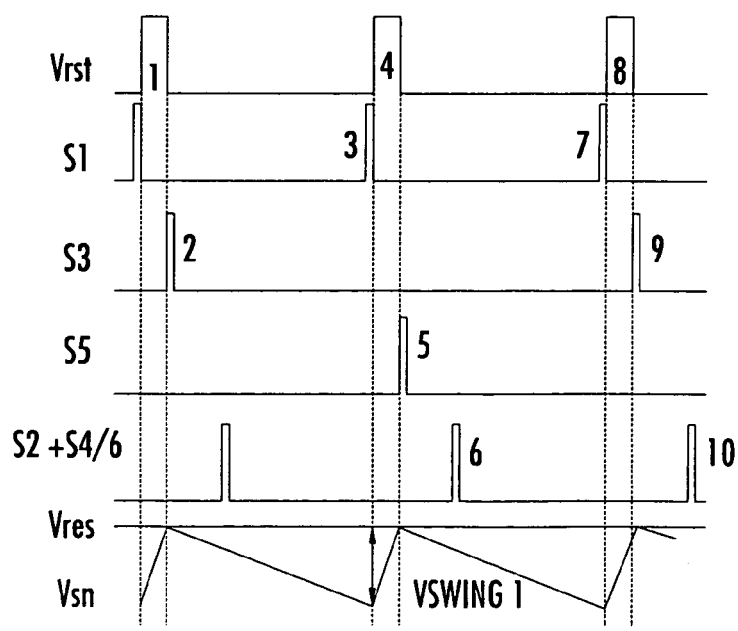
FIG. 12 is a timing diagram illustrating the operation of FIG. 11.

To understand the operation of the circuit in FIG. 11, reference is made to the timing diagram in FIG. 12. At point 1, Vrst goes high causing all the M2s in the array to conduct for resetting the photodiodes in the array. As soon as this is complete, (point 2) S2 goes high enabling CresA to sample the reset value of the pixel. The image array collects light until time 3 when the voltage corresponding to the pixel's exposure to light is collected. S1 is closed and the voltage is stored on the pixel's Csn.

At this time the system has collected a complete set of reset and image values and is ready to readout. Before this occurs, the next acquisition cycle starts. At point 4, Vrst goes high causing all the M2s in the array to conduct for resetting the photodiodes in the array. As soon as this is complete, (point 5) S4 goes high enabling CresB to sample the reset value of the pixel. As the image array collects light, the pixels' capacitors are accessed sequentially. At point 6, S2 is closed to output the image value Vsn stored on Csn onto the output signal conductor. For this sequence of images, S4 is closed to output the reset value Vres stored on CresA onto the reset value A conductor. The image array collects light until time 7 when the voltage corresponding to the pixel's exposure to light is collected. S1 is closed and the voltage is stored on the pixel's Csn.

At this time the system has collected another complete set of reset and image values and is ready to readout. Before this occurs, the next acquisition cycle starts. Point 8 is identical to point 1, and point 9 is identical to point 2. As the image array collects light, the pixels' capacitors are accessed sequentially. At point 10, S2 is closed to output the image value Vsn stored on Csn onto the output signal conductor. For this sequence of images, S6 is closed to output the reset value Vres stored on CresB onto the reset value B conductor.

The system continues to operate using the sequence described above. The important feature to note in FIG. 12 is that Vsn is able to be output on each frame.

In the layout shown in FIG. 8, the pitch of the sample capacitors is 1/6$^{th}$ the pitch of the pixels as there are 6 pixels vertically. For a larger array, a greater number of sample capacitors need to be fitted into the width of a pixel. This presents a practical limit to the architecture. The minimum width of sample capacitors is determined by the manufacturing technology used by the architecture. The maximum size of the pixel is determined by cost factors.

Figure 13:
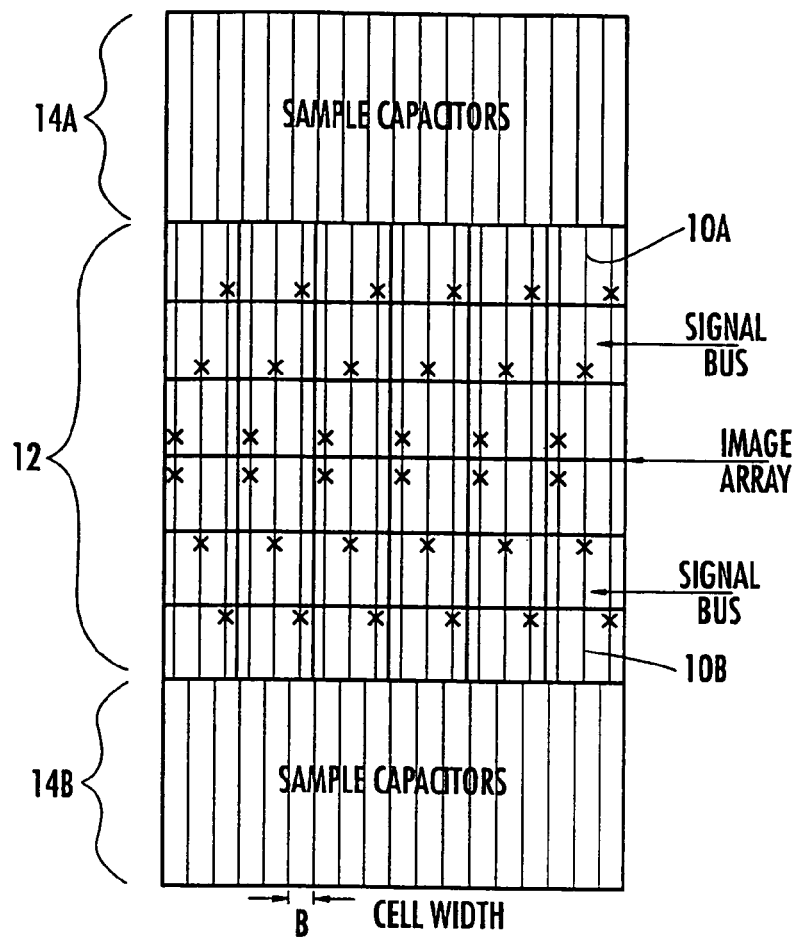
FIG. 13 is a view similar to FIG. 8 but showing a modified system layout.

An improved layout is shown in FIG. 13. This architecture has sample capacitors 14A and 14B at the top and bottom of the array 12. There are now two signal buses 10A and 10B divided in the center, and the cell width B is equal to 1/3 of a pixel. There are two advantages. The fewer signal bus conductors running across each pixel requires less metal, and hence, there is less obstruction of the pixel (i.e, a higher fill-factor) and hence greater sensitivity from the pixel. As the array is divided into two parts, the sample capacitors are shared top and bottom, resulting in twice the width available.

The following Table 1 illustrates the advantages.

TABLE 1

| Layout | Column Width | Pixel Array | Pixel Size | Image Plane | Imaging Area |
|---|---|---|---|---|---|
| FIG. 8 | 2 μm | 100 × 100 | 200 μm × 200 μm | 200 mm × 200 mm | 400 m$^2$ |
| FIG. 13 | 2 μm | 100 × 100 | 100 μm × 100 μm | 100 mm × 10 mm | 100 m$^2$ |

As can be seen in the final column, the improved layout technique of FIG. 13 produces a four-fold increase in area, and hence a corresponding reduction in cost per unit area.

Figure 14:
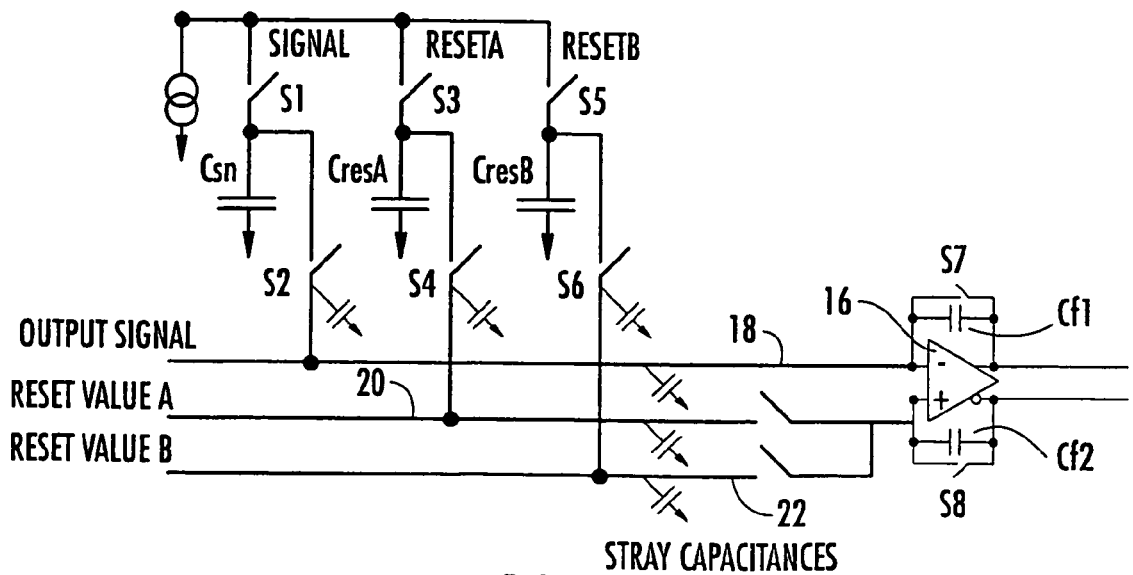
FIG. 14 shows a preferred readout arrangement for the circuit of FIG. 11.

Turning to FIG. 14, a preferred scheme for measuring and amplifying the two output signals will now be described. Associated with the switches S2, S4, S6 and the conductors output signal 18, reset value A 20, and reset value B 22, are unwanted stray capacitances. As the array size increases, the number of pixels, and therefore, the number of switches increases. The cumulation of all these switches can produce an unwanted capacitance roughly equal to that of the sampling capacitances. When the signals are read out (switches S2/S4/S6 closed), part of the charge stored on the capacitors Csn/CresA/CresB is used to charge the stray capacitors. This problem is known as charge sharing. This can easily be 50% to 70% of the signal, and reduces the output swing to 1/2 or 1/4 of the true signal.

Using a differential, charge sensitive amplifier 16 as shown in FIG. 14, charge sharing is avoided. Before the signal is read out, the switches S7, S8 are closed and the amplifier 16 is put into its common mode reset state. This discharges the capacitors Cf1, Cf2 on the feedback of the operational amplifier 16 and forces the conductors 18, 20, 22 to the common mode voltage. Switches S7/S8 are opened and S2, S4 (or S6) are then closed.

The nature of the operational amplifier is to ensure that its input remains at the common mode voltage. By doing so there is no change in the voltage on the lines 18, 20 and 22 and so there can be no loss of charge. During the readout, the voltages on Csn, CresA, CresB are also set to the common mode voltage. The change in voltage from that which was measured off the array requires a current to flow. This comes from the output of the op-amp 16 via the feedback capacitors Cf1, Cf2. For correct operation (symmetrical operation) the capacitance of Cf1=Cf2 and Csn=CresA=CresB. Hence:

Out1−Out2=(Vsignal−Vreset)×Csn/Cf1

Modifications and improvements may be made to the foregoing within the scope of the invention.

That which is claimed is:

1. A solid state imaging device comprising:
a two-dimensional array of pixels defining an image plane, the image plane comprising more than three rows of pixels;
readout electronics comprising a plurality of store circuits laterally adjacent the image plane for reading signals therefrom, with a store circuit corresponding to each pixel and comprising
first store circuitry for storing a reset value, and
second store circuitry for storing a readout value, with the readout value of a given pixel being modified by the stored reset value for that pixel; and
a multiconductor signal bus connected between said array of pixels and said readout electronics, said multiconductor bus comprising a respective conductor to provide a dedicated readout channel for only one pixel of said two-dimensional array of pixels defining the image plane.

2. A solid state imaging device according to claim 1, wherein each pixel comprises:
a photosensitive diode; and
a switching circuit for resetting and discharging said diode, said switching circuit consisting of
a first transistor for applying a reset pulse, and
a second transistor for connecting said diode to a conductor within said multiconductor signal bus.

3. A solid state imaging device according to claim 1, wherein said multiconductor signal bus comprises a plurality of vertically stacked conductors.

4. A solid state imaging device according to claim 1, wherein said readout electronics are laterally adjacent one side of the image plane.

5. A solid state imaging device according to claim 1, wherein said readout electronics are laterally adjacent two opposing sides of the image plane.

6. A solid state imaging device according to claim 1, wherein all pixels of said array of pixels are reset simultaneously and are read out simultaneously.

7. A solid-state imaging device according to claim 1, wherein each store circuit further comprises:
third store circuitry for storing a second reset value, with a current reset value and a current read out value being processed simultaneously based upon application of a new reset pulse.

8. A solid state imaging device according to claim 7, wherein said readout electronics further comprises:
a differential amplifier connected to said first, second and third store circuitry; and
a reset circuit for placing said differential amplifier in a common mode reset state prior to reading a signal.

9. A solid state imaging device comprising:
a two-dimensional array of pixels defining an image plane, the image plane comprising more than three rows of pixels, with each pixel comprising a photosensitive diode and a switching circuit for resetting and discharging said diode;
a multiconductor signal bus connected to said array of pixels, said multiconductor bus comprising a respective conductor to provide a dedicated readout channel for only one pixel of said two-dimensional array of pixels defining the image plane; and readout electronics comprising a plurality of store circuits laterally adjacent the image plane and connected to said multiconductor signal bus for reading signals from said array of pixels, with a store circuit corresponding to each pixel and comprising first store circuitry for storing a reset value, and second store circuitry for storing a readout value, with the readout value of a given pixel being modified by the stored reset value for that pixel.

10. A solid state imaging device according to claim 9, wherein said switching circuit consists of:

a first transistor for applying a reset pulse; and a second transistor for connecting said diode to a conductor within said multiconductor signal bus.

11. A solid state imaging device according to claim 9, wherein said signal bus comprises a multiconductor signal bus comprising a plurality of vertically stacked conductors.

12. A solid state imaging device according to claim 9, wherein said readout electronics are laterally adjacent one side of the image plane.

13. A solid state imaging device according to claim 9, wherein said readout electronics are laterally adjacent two opposing sides of the image plane.

14. A solid state imaging device according to claim 9, wherein all pixels of said array of pixels are reset simultaneously and are read out simultaneously.

15. A solid-state imaging device according to claim 9, wherein each store circuit further comprises:

third store circuitry for storing a second reset value, with a current reset value and a current read out value being processed simultaneously based upon application of a new reset pulse.

16. A solid state imaging device according to claim 15, wherein said readout electronics further comprises:

a differential amplifier connected to said first, second and third store circuitry; and a reset circuit for placing said differential amplifier in a common mode reset state prior to reading a signal.

17. A method for making a solid state imaging device comprising:

defining an image plane using a two-dimensional array of pixels, the image plane comprising more than three rows of pixels;

placing readout electronics comprising a plurality of store circuits laterally adjacent the image plane for reading signals from the array of pixels with a store circuit corresponding to each pixel and comprising first store circuitry for storing a reset value, and second store circuitry for storing a readout value, with the readout value of a given pixel being modified by the stored reset value for that pixel; and connecting a multiconductor signal bus connected between the array of pixels and the readout electronics, the multiconductor bus comprising a respective conductor to provide a dedicated readout channel for only one pixel of the two-dimensional array of pixels defining the image plane.

18. A method according to claim 17, further comprising forming each pixel to have a photosensitive diode, and a switching circuit connected thereto for resetting and discharging the diode.

19. A method according to claim 18, wherein the switching circuit consists of a first transistor for applying a reset pulse, and a second transistor for connecting the diode to a conductor within the multiconductor signal bus.

20. A method according to claim 17, wherein the multiconductor signal bus comprises a plurality of vertically stacked conductors.

21. A method according to claim 17, wherein the readout electronics are placed laterally adjacent one side of the image plane.

22. A method according to claim 17, wherein the readout electronics are placed laterally adjacent two opposing sides of the image plane.

23. A method according to claim 17, wherein the image device is configured so that all pixels of the array of pixels are reset simultaneously and are read out simultaneously.

24. A method according to claim 17, wherein each store circuit further comprises third store circuitry for storing a second reset value, with a current reset value and a current read out value being processed simultaneously based upon application of a new reset pulse.

25. A method according to claim 24, further comprising:

connecting a differential amplifier to the first, second and third store circuitry; and connecting a reset circuit to the differential amplifier for placing the differential amplifier in a common mode reset state prior to reading out a signal.

* * * * *